United States Patent
Jin et al.

(10) Patent No.: US 9,577,844 B2
(45) Date of Patent: Feb. 21, 2017

(54) MULTIMEDIA TERMINAL DEVICE HAVING INTEGRATED TELEPHONE SYSTEM AND USER INTERFACE METHOD

(75) Inventors: Yucheng Jin, Chalfont, PA (US); Christopher J. Cotignola, Doylestown, PA (US)

(73) Assignee: Google Technology Holdings LLC, Mountain View, CA (US)

(*) Notice: Subject to any disclaimer, the term of this patent is extended or adjusted under 35 U.S.C. 154(b) by 991 days.

(21) Appl. No.: 12/498,098

(22) Filed: Jul. 6, 2009

(65) Prior Publication Data
US 2011/0002325 A1    Jan. 6, 2011

(51) Int. Cl.
| | |
|---|---|
| H04L 12/66 | (2006.01) |
| H04M 1/24 | (2006.01) |
| H04M 1/253 | (2006.01) |
| H04W 24/00 | (2009.01) |
| H04M 1/725 | (2006.01) |

(52) U.S. Cl.
CPC ............... H04L 12/66 (2013.01); H04M 1/24 (2013.01); H04M 1/2535 (2013.01); H04M 1/725 (2013.01); H04W 24/00 (2013.01)

(58) Field of Classification Search
CPC   H04M 1/72519; H04M 1/253; H04M 1/2535; H04M 7/0066; H04M 7/0069; H04M 1/725; H04M 2250/06; H04M 2250/08; H04M 1/24; H04M 2250/56; H04W 88/16; H04W 84/12; H04W 24/00; H04L 12/66
USPC .................. 455/426.1, 426.2, 462, 465, 418, 419,455/420, 456.1
See application file for complete search history.

(56) References Cited

U.S. PATENT DOCUMENTS

| | | | |
|---|---|---|---|
| 2003/0064719 A1* | 4/2003 | Horne .......................... | 455/423 |
| 2004/0121648 A1* | 6/2004 | Voros ........................... | 439/535 |
| 2004/0141484 A1* | 7/2004 | Rogalski et al. .............. | 370/338 |
| 2006/0123428 A1* | 6/2006 | Burns ........................... | 719/318 |
| 2009/0013210 A1* | 1/2009 | McIntosh et al. ................ | 714/4 |

OTHER PUBLICATIONS

Westell WireSpeed ADSL Modem User Guide, Jun. 2001, 61 pages.*

* cited by examiner

*Primary Examiner* — Thai Vu
(74) *Attorney, Agent, or Firm* — Wolfe-SBMC

(57) ABSTRACT

Customer premise equipment provides a communication gateway with a network of a service provider and includes a multimedia terminal device for installation on the customer's premises typically at an out-of-the-way location. The multimedia terminal device includes a modem having an embedded media terminal adaptor and an integrated telephone base station, for instance, to provide both Internet connectivity and Voice-over-Internet-Protocol telephone service to the customer premises. A portable cordless telephone handset communicates via wireless communication signals with the telephone base station thereby providing telephone service to the premises. The handset is also capable of transmitting commands to the telephone base station for purposes of providing a user interface for the components of the multimedia terminal device. For example, as a result of a sent command, status or other information can be forwarded to the handset, the modem can be instructed to reboot, a test can be initiated on the multimedia terminal device, or a set up operation can be accomplished. The display screen of the handset can be used to provide the customer with the requested information or results.

23 Claims, 4 Drawing Sheets

FIG. 3    100

MULTIMEDIA TERMINAL DEVICE HAVING INTEGRATED TELEPHONE SYSTEM AND USER INTERFACE METHOD

FIELD OF THE INVENTION

Customer premises home gateway equipment, such as equipment including a multimedia terminal adapter or the like, having an integrated wireless telephone system with one or more wireless handsets is disclosed, and more particularly, customer premises equipment that enables the handset of the wireless telephone system to communicate with, and remotely provide commands to, a multimedia terminal adapter, modem, or like customer premises equipment for purposes of causing the equipment to perform or accomplish a desired task and to visually or audibly communicate the results of the task to the user via the handset is disclosed. A user interface method of remotely providing commands to customer premises equipment using a portable cordless telephone handset of a telephone system is also disclosed.

BACKGROUND OF THE INVENTION

Customer premises equipment can include a modem, such as a DOCSIS cable modem or DSL modem, connected to an Internet service provider's network to provide the customer with Internet access via the modem. In many instances the customer premises equipment may also include a wireless network with a wireless router. In this case, the modem is connected to the wireless router so any computer or like electronic device connected to the wireless network can access the Internet via the modem.

With the advent of Voice-over-Internet-Protocol (VoIP), DOCSIS cable modems and DSL modems can be used, not only for purposes of providing high-speed Internet access to a customer, but also to provide telephone service for the premises. For this specific purpose, the customer premises equipment can include a separate media terminal adapter (MTA) as a standalone device connected to the above referenced modem to provide the VoIP service. The MTA interfaces with an IP network, for example, via the above referenced modem, and is operable to adapt VoIP data for use by other customer premises equipment, such as a telephone system including a separate base unit and a set of wireless handsets that are distributed on the premises. The MTA can be used for purposes of delivering all basic phone services to the customer such as handling voice compression, packetization, security, and call signaling and can support older phone handsets and fax machines.

More recently, combined customer premises equipment include a MTA embedded within (i.e., built directly into) a DOCSIS cable or DSL modem to bundle Internet and VoIP services via installation of a single device. Such a combination is often referred to as an eMTA (embedded Media Terminal Adapter). The MTA and modem components of an eMTA are typically assigned separate Media Access Control (MAC) and IP addresses, and the eMTA includes multiple jacks for connection to phone lines, such as RJ-11 jacks, and for data connectivity such as through an Ethernet, USB, HPNA, and/or wireless interface.

Further, a so-called Modular-embedded Multimedia Terminal Adaptor (M-eMTA) provides a single device for serving residential multi-dwelling unit costumers and multi-tenant environments for business, commercial and residential customers. The M-eMTA is used to provide high speed data service and high quality VoIP telephone service separately to each of the multiple customers within the multi-dwelling unit or multi-tenant environment.

In most instances, the above referenced modems, routers, MTAs, eMTAs, M-eMTAs, and like customer premises equipment are installed and are physically located in an out-of-the-way location at the customer premises. For example, these devices may be located in a basement, in a closet such as in a utility closet adjacent to electrical box equipment, at an outdoor location, in a common room serving multiple tenants, or at some other remote and infrequently accessed location at the customer premises. Some customer premises equipment may generate operational status indications so that users can determine the operational status of the equipment, and most include a nameplate, sticker or the like that identifies MAC and serial number information. Of course, other equipment may not provide such information.

As an example of status indications, a modem may include several LEDs on its housing that may be activated to indicate that the modem is powered and communicating properly with other devices. Information concerning some equipment, such as a router, may be accessible only through a web-based graphical user interface (GUI). For example, if an IP device for a router in the wireless network is known, the user may access the web-based GUI for the router through a computer system connected to the wireless network. The web-based GUI may provide some status information for the router, as well as modifiable settings.

On certain occasions, the customer will be requested or required to take some action with respect to the customer premises equipment. For example, when trouble-shooting a problem with the equipment, the customer may be requested by technical support personnel to provide the MAC and serial number of an eMTA or may be requested to reboot the eMTA (i.e., disconnect the power followed by re-connecting the power). As another example, a customer may determine it desirable to run an Internet speed check on the eMTA to determine the cause of a slow Internet connection and/or may want to run a condition check on the eMTA to determine the cause of an intermittent Internet connection. Still further, a customer may need to set up a wireless access point in the home gateway equipment.

Most of the above referenced actions, require the customer to physically go to the location of the equipment on the customer premises to view the LEDs, nameplates, tags, stickers or the like provided on these devices. The same is true if the user needs to reboot the equipment with respect to disconnecting the power. Obviously, if this equipment is located in an out-of-the-way location at the customer premises, this tends to be an undesirable task.

If some information concerning the equipment is available via a web-based GUI, the customer may access the web-based GUI via a computer to access some of the desired information. However, some users may not have a personal computer to view the web-based GUI to get information, or some users may not have the knowledge to use a PC to access the web-based GUI. In other instances, a web-based GUI may not be provided for some equipment or the customer may be experiencing problems with his/her Internet connection.

SUMMARY OF THE INVENTION

Customer premise equipment provides a communication gateway with a network of a service provider and includes a single multimedia terminal device for installation on the customer's premises at an out-of-the-way location and at least one portable cordless telephone handset. The multimedia terminal device includes an integrated modem, media terminal adaptor, and telephone base station providing both Internet connectivity and Voice-over-Internet-Protocol telephone service to the customer premises. The portable cordless telephone handset communicates via wireless communication signals with the telephone base station thereby providing telephone service to the premises. The handset is capable of generating and transmitting commands to the telephone base station for remotely directing the multimedia terminal device to provide status or other information to the handset, to reboot the modem, to run a test on the multimedia terminal device, or to run a set up operation.

According to another aspect, a multimedia terminal device provides a communication gateway between a customer premises and a service provider's network and includes an embedded media terminal adaptor configured to provide communication to and from the network and to provide Voice-over-Internet Protocol (VoIP) telephone service capability. In addition, the multimedia terminal device includes a telephone base station integrated with the embedded media terminal adaptor configured to provide wireless telephone communications to and from at least one portable cordless telephone handset having a display screen. Further, the multimedia terminal device includes a communication channel that directly interconnects the telephone base station with the embedded media terminal adaptor. The handset has at least one microprocessor enabling selection, generation and sending of a command to the telephone base station for directing the embedded media terminal adaptor to perform a desired task. The embedded media terminal adaptor has one or more processors for receiving the command via the communication channel, for performing the desired task, and for forwarding information concerning the task to the handset via the integrated telephone base station for display on the display screen of the handset.

According to yet a further aspect, a method of providing user interface to a multimedia terminal device is provided. The method includes selecting a command from a menu displayed on a display screen of a portable cordless telephone handset and transmitting a wireless communication signal corresponding to the command remotely from the handset to a telephone base station integrated with an embedded media terminal adaptor that provides Internet connectivity and Voice-over-Internet-Protocol (VoIP) telephone service to a customer premises. As a result of transmitting the command, the embedded media terminal adaptor performs a desired task and forwards information concerning the task to the handset for display on the display screen.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION OF THE INVENTION

Figure 1:
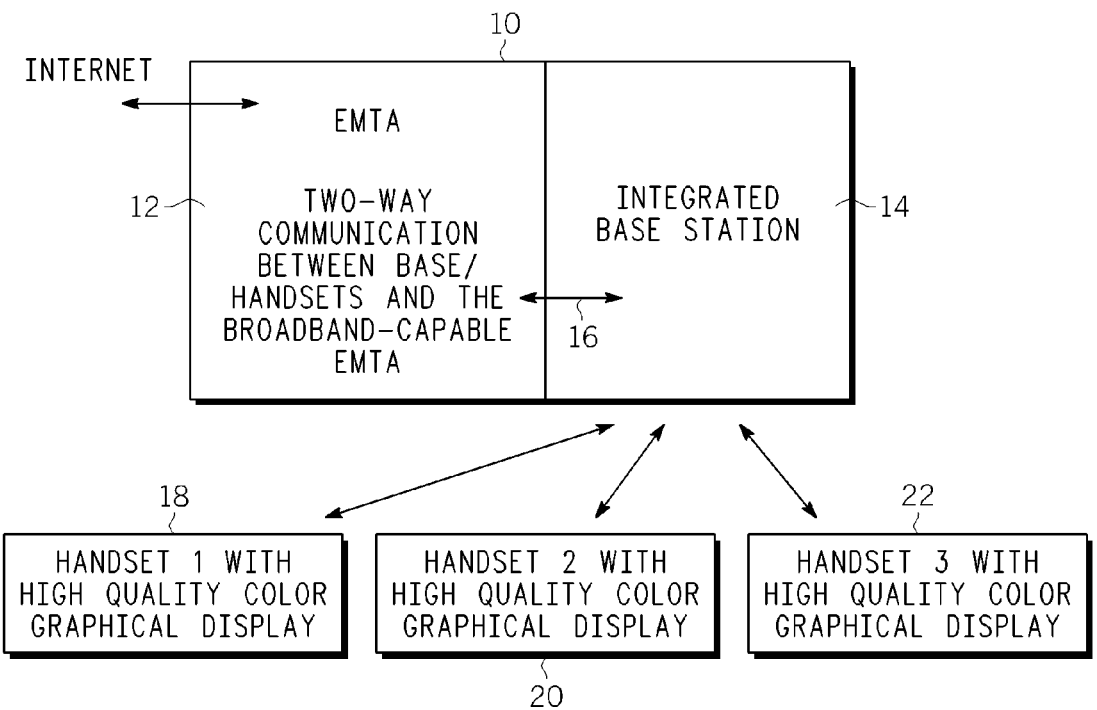
FIG. 1 illustrates a simplified eMTA with integrated telephone system according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, a telephone system for the premises of a customer for use in making and receiving telephone calls is integrated directly with a modem having an embedded media terminal adaptor in a single customer premises device. This single device simplifies installation and enables this one installation to provide the customer with Internet connectivity, Voice-over-Internet Protocol (VoIP) telephone service capability, and the components required to comprise a telephone system for use on and throughout the premises. Thus, a separate telephone system including base station, wiring, wiring jacks, telephone handsets, etc. is not necessarily required; rather, this equipment is integrated and provided with the single device. Of course, additional handsets of alternate styles may be obtained separately and registered with the telephone base station of the single device.

In one contemplated embodiment, the modem and a MTA are provided as a so-called embedded media terminal adaptor (eMTA) unit of the single device and the telephone system can include a base station built directly into the single device and integrated with the eMTA unit. The telephone system also includes one or more separate portable cordless telephone handsets that communicate via wireless communication with the telephone base station integrated into the single device. The telephone handsets are portable handheld devices that can be carried in a pocket, hooked on a belt, or located anywhere on the premises for communication with the telephone base station. The telephone handsets can be freely carried from room to room by the customer and used as any conventional telephone handset for making and receiving telephone calls.

The modem of the eMTA provides the conventional operation of providing Internet connectivity to the customer, such as high speed DOCSIS or DSL Internet connectivity, and the MTA portion of the eMTA unit provides the ability to use the device for Voice-over-Internet Protocol (VoIP) service via its interconnection to the modem and to the built-in telephone base station. The telephone base station communicates with the handsets and the eMTA unit for providing the conventional operations of a cordless telephone system, such as making and receiving telephone calls as discussed above.

A typical telephone handset will include a keypad or other phone number entry component or contact entry listing, a microphone or other voice-receiving component, a speaker or other sound-emitting component, a display screen such as an LCD screen or the like, and a receiver, transmitter, and/or transceiver or like electronics for two-way communication of wireless signals with the built-in telephone base station integrated with the eMTA unit. Of course, various designs of telephone handsets can be utilized; for example, handsets providing a keypad or the like via a touch screen can be used as well as handsets having a display screen providing a high-quality color graphical display.

According to the present invention, two-way communication is established and provided between the integrated telephone base station and the eMTA. This two-way communication is not limited merely to providing signals relative to voice communications as accomplished during a typical telephone call; rather, this two-way communication provides data and/or broadband communications therebetween to permit the portable cordless telephone handsets to be used to actively communicate and provide commands to the eMTA unit for a variety of user interface purposes including trouble shooting, rebooting, and set-up.

Accordingly, the portable cordless telephone handset can be used to query the eMTA unit of the single device for information such as MAC address and serial number information as well as diagnostic information, and the requested information can be displayed in an easy-to-read format on the graphical display of the telephone handset. Thus, for example, during a trouble-shooting service call to a service provider's technical support operator, the customer can readily and quickly obtain device information requested by the technical support operator without having to physically go to the out-of-the-way location of the installed device and inspect nameplates, LEDs, stickers or the like physically provided on the device. This also eliminates the need to log onto a personal computer that may or may not be functioning properly at the time of the trouble-shooting service call. Thus, the same telephone handset used to talk to the technical support operator can also be used to obtain the requested information while remaining at a comfortable location remote from the installed device.

Often, a customer may find it necessary to reboot the eMTA for any of a number of reasons such as in an attempt to trouble-shoot a problem. The portable cordless telephone handset can be used to send a signal to command the eMTA to initiate an operation that causes the eMTA to reboot. As discussed above, the customer need not physically go to the location of the device and switch the power OFF to the device and then switch the power back ON. Rather, the customer can remotely reboot the eMTA via simple navigation of menu screens provided on the portable cordless telephone handset and by simply pressing "enter". The direct integration of the telephone base station with the eMTA permits this command to be sent from the handset to the base station and then directly to the eMTA unit. This command is not sent over the Internet; rather, it is transmitted directly through the integrated telephone base station to the eMTA.

Further, the portable cordless telephone handset can also be used to query the eMTA unit for status information with respect to Internet connectivity, performance, battery life, cable signal strength, signal-to-noise ratio (SNR), channel number, bandwidth, and the like. In this manner, the handset actively contacts the eMTA for this information and commands the eMTA to provide the requested information to be sent directly to the graphical display screen of the handset. Of course, this information could also, or alternatively, be provided by way of audible communication by the handset via the handset speaker. These types of commands enable real-time Internet speed checks and eMTA condition checks.

As a specific example, if a customer wants to determine if a "slow" Internet connection is caused by the customer's own personal computer or by the external Internet connection being provided to the eMTA, the portable cordless telephone handset can be used to send a command directly to the eMTA via the integrated telephone base station to run a speed test application. The results of the test are visually displayed on the display screen of the telephone handset to aid in the attempt to trouble shoot the problem. A significant advantage provided via this means of commanding the eMTA to run the test is that the personal computer that is subject to the "slow" Internet connection is not required to be used to diagnose the problem; thus, the "slow" Internet connection being experienced by the computer should not have an effect on the test and speed of accomplishing the test.

Another example of tests includes when a customer desires information such as SNR, channel number and bandwidth information for purposes of trouble shooting an intermittent Internet connection. If a personal computer is used to access this information, the customer is required to disconnect the computer from the router and reconnect the computer directly to the eMTA and change the computer from using DHCP to using a fixed IP address. In addition, the customer needs to search for information on how to log onto a built-in web page of the eMTA and obtain the desired information. All of the above steps are not trivial to a typical customer. In contrast, the customer can utilize the portable cordless telephone handset as described above to simply navigate to a menu item on the handset and press an "enter" button to send a signal directly to the eMTA to command the eMTA to run the desired tests and report the results directly on the display screen of the telephone handset. This greatly simplifies the task for the customer and eliminates numerous relatively complicated tasks required via use of a personal computer.

Still further, display menus can be provided on the display screen of the portable cordless telephone handsets to "walk" the costumer through a set-up procedure, for instance, via a set-up wizard mode of operation. Various set-up operations can be fairly complex to a typical customer, and the wizard mode enables simplification of the process for the customer. Examples of such operations include wireless security setup, dynamic host configuration protocol (DHCP) setup, Local-Area-Network/Wide-Area-Network (LAN/WAN) setup, and the like. With the telephone handset as described above, the customer is able to set up all critical parameters using only the telephone handset. As a related example, a customer can check how many clients are connected to a wireless gateway for purposes of preventing use by hackers or unauthorized entities. This check can be performed at anytime from anywhere on the premises using only the portable cordless telephone handset and without turning on a personal computer.

Turning to a specific simplified embodiment illustrated in FIG. 1, an eMTA with integrated telephone system includes a single customer premises device 10 installed in an out-of-the-way-location as defined above. The single device 10 includes an eMTA unit 12 and a telephone base station 14 that is assembled together as manufactured and that is installed as a single unit at the customer premises. The eMTA unit 12 of the single device 10 is connected to the Internet as shown in FIG. 1 to provide Internet connectivity and VoIP telephone service capability to the customer. The telephone base station 14 communicates via a two-way communication channel 16 to the eMTA unit 12 and also communicates with one or more portable cordless telephone handsets 18, 20 and 22 via wireless communication.

The telephone base station 14 and handsets 18, 20 and 22 are capable of operating as a conventional cordless telephone system and enable the customer to make and receive telephone calls. For this purpose, the base station 14 communicates with the eMTA unit 12 via the communication channel 16 and transmits and receives wireless voice data communications to and from the handsets 18, 20 and 22 for telephone calls.

In addition to voice data for telephone calls, the telephone base station 14 is adapted to receive wireless command signals from the portable cordless telephone handsets, 18, 20 and 22 and direct the command signals to the eMTA unit 12 via the communication channel 16. In response thereto, the eMTA unit 12 undertakes a desired action and then transmits the results through the telephone base station 14 to one or more of the handsets 18, 20 and 22. The requested information and/or report data is displayed on a graphical display screen of the handset 18, 20 and 22. As an alternative, or in addition to the visual display, the handset can provide an audible report via its speaker and/or an ear piece associated with the handset. Specific examples of commands and actions or information are discussed below with respect to FIGS. 3-5.

Figure 2:
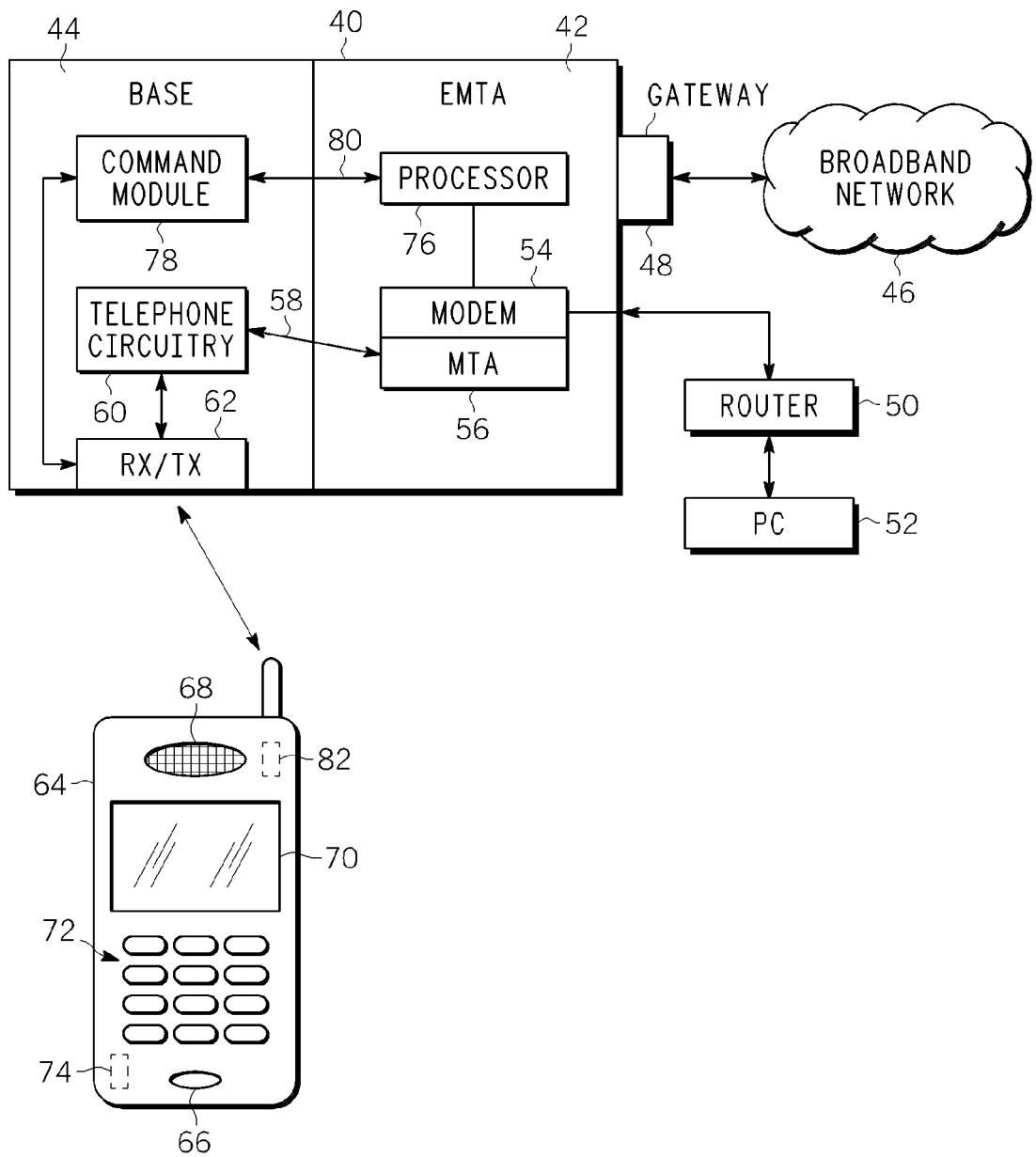
FIG. 2 illustrates a further embodiment of an eMTA with integrated telephone system.

Turning to FIG. 2, it provides a more detailed illustration of an embodiment of an eMTA with integrated telephone system. A single device 40 is installed at the customer premises and includes an eMTA unit 42 and a telephone base station 44. The eMTA unit 40 connects to a broadband network 46 via a customer gateway 48 which provides a connection of a service provider's network to the eMTA unit 42. The service provider will typically be a telephone or cable service provider that in addition to cable or telephone service also provides high-speed Internet service. The broadband network 46 may include connectivity to the Internet and other private or public networks, including the service provider's network. A router 50 can be connected to the eMTA unit 42 and to a personal computer 52 thereby providing Internet connectivity to the customer's computer 52.

The eMTA unit 42 includes the necessary components to operate as a modem 54, as is known in the art, to modulate and demodulate data received from, or transmitted to, the broadband network 46. As an example, the modem 54 can be a DOCSIS cable modem or digital subscriber line (DSL) modem.

The eMTA unit 42 also includes a MTA unit 56 that interfaces with the modem 54 and is operable to adapt VoIP data for use by the telephone base station 44. Thus, a direct connection 58 for voice telephone data is provided between the MTA unit 56 and telephone circuitry 60 of the telephone base station 44. The telephony circuitry 60 of the base station 44 is known in the art and is for communicating voice data to and from a portable cordless telephone handset 64 via a receiver/transmitter module 62. For this purpose, the handset 64 may communicate with the telephone base station 44 via radio frequency (RF). As an example, wireless communication between the handset 64 and the telephone base station 44 may be performed using the DECT 6.0 protocol or another conventional protocol for cordless telephone systems.

The handset 64 includes input and output (I/O) devices and other circuits, not shown, for providing conventional functionality for facilitating telephone calls. Examples of the I/O devices include a microphone 66, a speaker 68, a graphical display screen 70, a keypad 72 including for instance an "enter" key or the like, and a receiver/transmitter module 82. The handset 64 can also include a microprocessor or like controller 74 that provides the customer with a set of menu options for sending command signals to the telephone base station 44 and/or eMTA unit 42 of the single device 40.

One of the eMTA unit 42 or telephone base unit 44 also includes a processor 76 or like controller for receiving and executing various commands initiated by use of the handset 64. For example, the telephone base station 44 may include a command module 78 connected via one of more two-way communication channels 80 to the processor 76 of the eMTA unit 42. The command module 78 communicates with the receiver/transmitter module 62 of the telephone base station 44 for purposes of communicating with the handset 64.

Accordingly, if a customer determines it desirable to provide a command to the eMTA unit 42 for any of a variety of reasons, the customer can use the keypad 72 and screen 70 to navigate through various menus, select a desired option, and hit an "enter" key to send the command to the eMTA unit 42. This command is received by the receiver/transmitter module 62, is forwarded to the command module 78 which then forwards the command to the processor 76. The processor 76 then causes a particular task to be run on the necessary component or components of the eMTA unit 42. After the task is performed, some type of information or report data is collected by the processor 76 and forwarded to the handset 64 via the command module 78 and receiver/transmitter module 62. The requested information or the results of a test or like are displayed on the screen 70 of the handset 64 where they can readily be viewed by the customer remote from the location of the installed device 40.

Various modules, processors, microprocessors, controllers, units and the like are referenced above. It will be apparent to one of ordinary skill in the art that the modules, processors, controllers, units and the like may be implemented as electronic components, software, hardware or a combination of hardware and software. Also, it will be apparent to one of ordinary skill in the art that the single consumer premises device 40, eMTA unit 42, telephone base station 44 and handset 64 may include many conventional circuits and software not shown so as not to unnecessarily obscure the embodiments. Further, the eMTA unit may be an M-eMTA unit as previously discussed.

Figure 5:
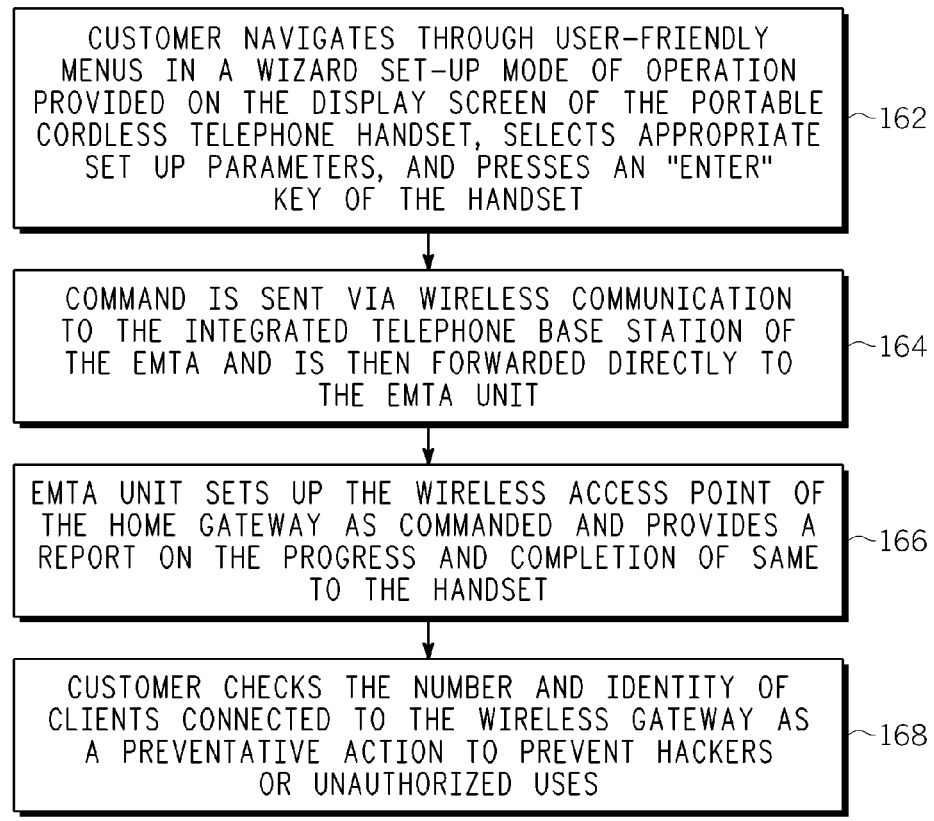
FIG. 5 illustrates a flow chart with respect to a method of setting up a wireless access point in a home gateway.
Figure 3:
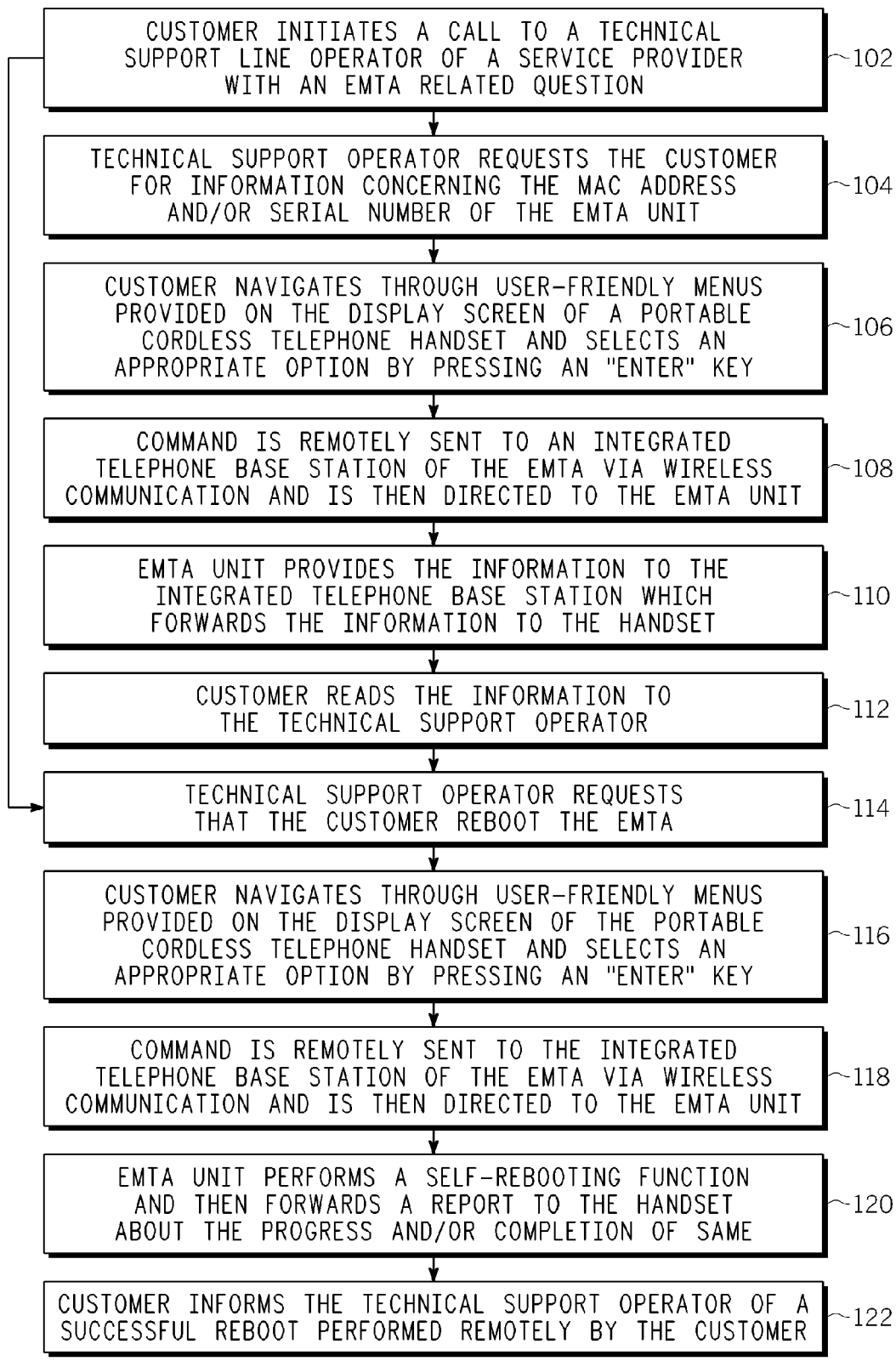
FIG. 3 illustrates a flow chart with respect to a method of requesting information from or rebooting the eMTA with integrated telephone system.
Figure 4:
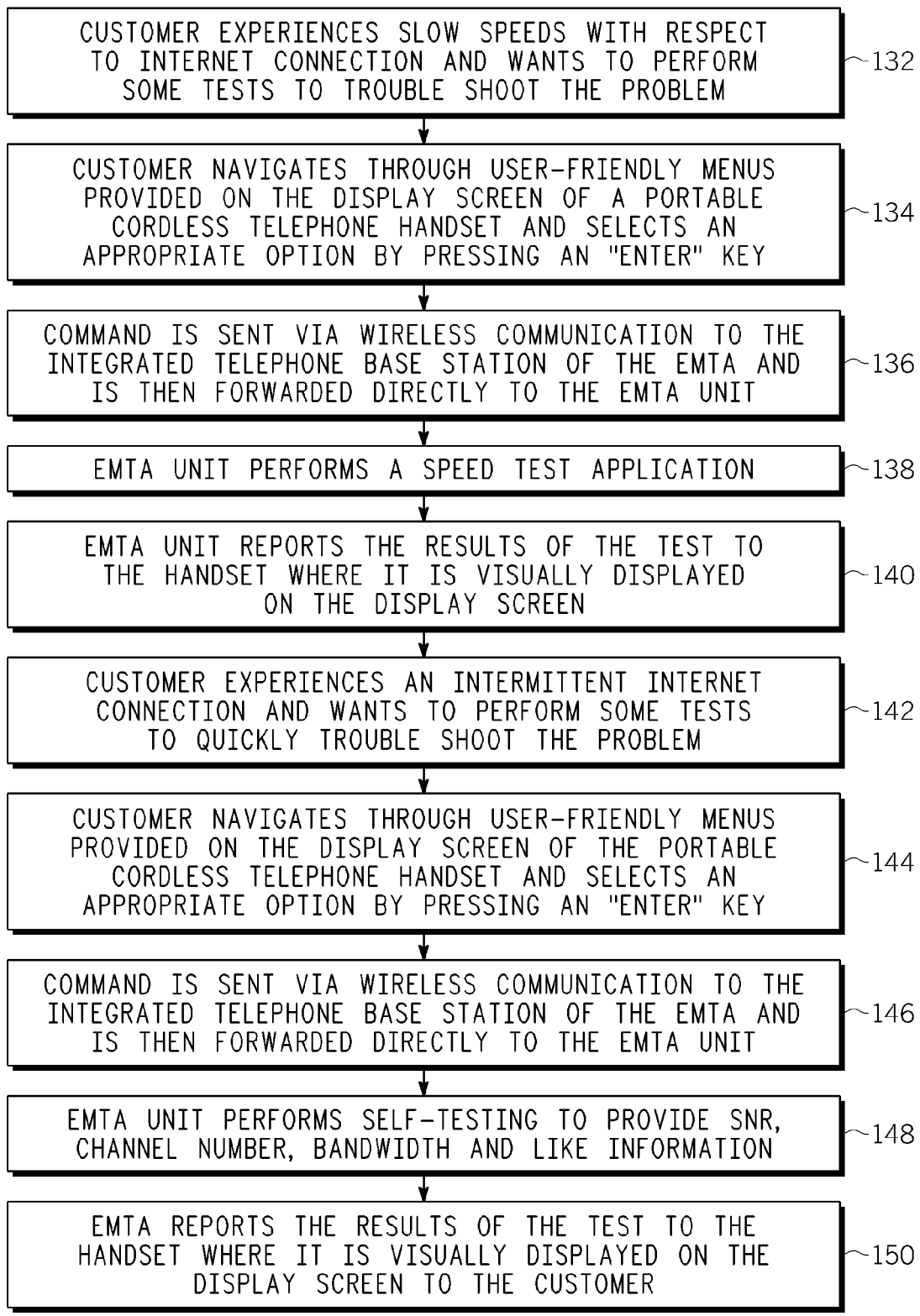
FIG. 4 illustrates a flow chart with respect to a method of performing trouble-shooting tests on the eMTA with integrated telephone system to diagnose a problem.

FIGS. 3-5 illustrate various examples of user interface commands that a customer may send to a customer premise device from a portable telephone handset. Of course, these are provided by way of example, and not by way of limitation.

FIG. 3 depicts a flow chart of a method 100 that can be used to enhance field support for service provider-to-customer interaction. For example, a customer may initiate a call to a technical support line operator of a service provider with an eMTA related question. See step 102. In turn, the technical support operator may request the customer for information concerning the MAC address and/or serial number of the eMTA unit. See step 104. The customer then navigates through user-friendly menus provided on the display screen of a portable cordless telephone handset, which can be the same handset used to call the technical support operator, and selects an appropriate option by pressing an "enter" key of the handset. See step 106. This command is remotely sent to an integrated telephone base station of the eMTA via wireless communication and is then directed to the eMTA unit. See step 108. The eMTA unit provides the requisite information to the integrated telephone base station which forwards the information to the handset. See step 110. The customer can then read the information to the technical support operator. See step 112.

In some situations, a technical support operator may request that the customer reboot the eMTA. See step 114. In response to this request, the customer simply navigates through user-friendly menus provided on the display screen of the portable cordless telephone handset, which can be the same handset used to call the technical support operator, and selects an appropriate option by pressing an "enter" key of the handset. See step 116. This command is remotely sent to the integrated telephone base station of the eMTA via wireless communication and is then directed to the eMTA unit. See step 118. The eMTA unit performs a self-rebooting function and then forwards a report to the handset about the progress and/or completion of same. See step 120. The customer can then inform the technical support operator of a successful reboot performed remotely by the customer. See step 122.

FIG. 4 depicts a flow chart of a method 130 that can be used by a customer with respect to performing real-time Internet speed checks and real-time eMTA condition checks. For example, a customer may be experiencing slow speeds with respect to his/her Internet connection and may want to perform some tests to trouble shoot the problem. See step 132. The problem could be caused by the customer's computer or could be due to a problem being experienced external to the customer premises equipment. The computer cannot be used to initiate the test because it is experiencing the problem being diagnosed. Accordingly, the customer simply navigates through user-friendly menus provided on the display screen of the portable cordless telephone handset and selects an appropriate option by pressing an "enter" key of the handset. See step 134. This command is sent via wireless communication to the integrated telephone base station of the eMTA and is then forwarded directly to the eMTA unit. See step 136. The eMTA unit performs a speed test application on itself (see step 138) and then reports the results of the test to the handset where it is visually displayed on the display screen (see step 140).

In an additional example, the customer may be experiencing an intermittent Internet connection and may want to perform some tests to quickly trouble shoot the problem without having to reconfigure wiring, router settings, or the like. See step 142. Accordingly, the customer simply navigates through user-friendly menus provided on the display screen of the portable cordless telephone handset and selects an appropriate option by pressing an "enter" key of the handset. See step 144. This command is sent via wireless communication to the integrated telephone base station of the eMTA and is then forwarded directly to the eMTA unit. See step 146. The eMTA unit performs self-testing to provide SNR, channel number, bandwidth and like information (see step 148) and then reports the results of the test to the handset where it is visually displayed on the display screen to the customer (see step 150).

FIG. 5 depicts a flow chart of a method 160 that can be used by a customer with respect to setting up a wireless access point in the home gateway. Accordingly, the customer simply navigates through user-friendly menus in a wizard set-up mode of operation provided on the display screen of the portable cordless telephone handset, selects appropriate set up parameters, and presses an "enter" key of the handset. See step 162. This command is sent via wireless communication to the integrated telephone base station of the eMTA and is then forwarded directly to the eMTA unit. See step 164. The eMTA unit will then set up the wireless access point of the home gateway as commanded and provides a report on the progress and completion of same to the handset. See step 166. If desired, at any time, the customer can check the number and identity of clients connected to the wireless gateway as a preventative action to prevent hackers or unauthorized uses. See step 168. This checking step can be accomplished at any time, at anywhere on the premises, using only the telephone handset and without the need of a computer.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

We claim:

1. A system for providing a communication gateway with a network of a service provider, the system comprising:
    a single multimedia terminal device comprising:
        a modem for providing Internet connectivity to the system via the network of the service provider;
        an embedded media terminal adaptor (eMTA) for providing voice over Internet Protocol (VoIP) telephone services to the system based, at least in part, on the Internet connectivity provided by the modem; and
        an integrated telephone base station for providing wireless connectivity between the single multimedia terminal device and one or more devices external to the single multimedia terminal device, the integrated telephone base station configured to communicate with the eMTA directly over a communication channel internal to the single multimedia terminal device to provide the VoIP over the wireless connection; and
    at least one portable cordless telephone handset comprising at least one microprocessor or controller configured to enable the at least one portable cordless telephone handset to:
        access the VoIP telephone services provided by the eMTA by communicating wireless voice data communication signals with the integrated telephone base station;
        initiate one or more commands to the single multimedia terminal device by communicating one or more wireless command signals with the integrated telephone base station, the one or more wireless command signals comprising at least one of:
            a command to provide information describing the single multimedia terminal device to the at least one handset;
            a command to reboot the modem;
            a command to run a test on the single multimedia terminal device; and
            a command to run a set up operation; and
        transmit, to the integrated telephone base station and during a voice call session that accesses the integrated telephone base station, at least one of the one or more wireless command signals.

2. The system according to claim 1, wherein the at least one microprocessor or controller is further configured to enable the at least one portable cordless telephone handset to:
    receive information from the single multimedia terminal device as a result of initiating at least one command of the one or more commands; and
    display the received information on a graphical display screen of the at least one portable cordless telephone.

3. The system according to claim 1, wherein the information describing the single multimedia terminal device comprises a status of the single multimedia terminal device.

4. A system comprising:
   a multimedia terminal device for providing a communication gateway between at least one computing device and a service provider's network, the multimedia terminal device comprising:
      an embedded media terminal adaptor (eMTA) configured to provide voice over Internet Protocol (VoIP) telephone service capability based, at least in part, on communications to and from the service provider's network;
      a telephone base station integrated with the eMTA and comprising a transmitter and a receiver configured to provide wireless connectivity between the multimedia terminal device and at least one telephone handset; and
      a communication channel within the multimedia terminal device directly connecting the eMTA and the integrated telephone base station to provide direct communication between the integrated telephone base station and the eMTA,
      the integrated telephone base station further configured to:
         transmit and receive wireless voice data telephone communications, with the at least one telephone handset using the transmitter and receiver during an active voice data call; and
         receive a wireless command signal from the at least one telephone handset during the voice data call, the wireless command signal the eMTA to perform a desired task, the eMTA further comprising one or more processors configured to enable the eMTA to:
            receive the wireless command signal directly from the integrated telephone base station via communication channel;
            perform the desired task; and
            forward information associated with the desired task directly to the integrated telephone base station for wireless delivery to the at least one wireless handset during the active voice data call, the desired task comprising providing information describing the multimedia terminal device.

5. The system according to claim 4, wherein the service provider's network comprises Internet connectivity, and a modem of the eMTA is configured to provide the Internet connectivity to at least one computer external to the multimedia terminal device.

6. The system according to claim 5, wherein the modem comprises a DOCSIS modem or a DSL modem.

7. The system according to claim 4, the multimedia terminal device further comprising a voice data communication channel directly interconnecting the eMTA and the integrated telephone base station effective to provide the VoIP telephone service capability between the integrated telephone base station and the at least one wireless handset.

8. The system according to claim 4, wherein the integrated telephone base station wirelessly transmits the information associated with the desired task to the at least one wireless handset via the transmitter.

9. The system according to claim 4, further comprising the at least one wireless handset, wherein the at least one wireless handset comprises:
   a display screen; and
   at least one microprocessor or controller configured to:
      store a set of menus;
      display the set of menus on the display screen effective to display a list of a plurality of different commands; and
      enable selection of a command from the list.

10. The system according to claim 9, wherein the at least one wireless handset is further configured to:
   send the command to the integrated telephone base station as the wireless command signal using a transmitter internal to the at least one wireless handset;
   receive the information associated with the desired task using a receiver internal to the at least one wireless handset; and
   display the received information on the display screen.

11. The system according to claim 10, wherein the display screen comprises a color graphical display screen.

12. The system according to claim 9, wherein the at least one microprocessor or controller of the at least one wireless handset is further configured to send at least one additional command to the eMTA via the integrated telephone base station, the at least one additional command comprising:
   a command to reboot the eMTA;
   a command to run a test on the eMTA; or
   a command to perform a set-up operation.

13. The system according to claim 4, wherein the communication channel within the multimedia terminal device directly connecting the eMTA and the integrated telephone base station provides a two-way broadband communication channel that enables the integrated telephone base station to transmit a command associated with the wireless command signal to the eMTA, and enables the eMTA to transmit the information associated with the desired task to the integrated telephone base station.

14. The system according to claim 4, wherein the information describing the multimedia terminal device comprises a status of the multimedia terminal device.

15. A method of providing a remote user interface to a multimedia terminal device, the method comprising:
   initiating, over a wireless connection between a portable cordless telephone handset and a telephone base station integrated into the multimedia terminal device, a voice data call using the portable cordless telephone handset;
   selecting a command from a menu displayed on a display screen of the portable cordless telephone handset during the voice data call, the command requesting the multimedia terminal device perform a desired task;
   transmitting, using the portable cordless telephone handset and over the wireless connection to the telephone base station, a wireless communication signal corresponding to the command during the voice data call; and
   receiving, at the portable cordless telephone handset and from the telephone base station over the wireless connection, information describing the multimedia terminal device.

16. A method according to claim 15 further comprising:
   receiving, from the telephone base station over the wireless connection, the information from an embedded media terminal adaptor (eMTA) internal to the multimedia terminal device in response to sending a query command to the multimedia terminal device; and
   displaying, on the display screen of the portable cordless telephone handset, at least some of the information.

17. A method according to claim 16, wherein the information includes a MAC address and serial number of the eMTA.

18. A method according to claim 15, further comprising selecting at least one additional command displayed on the display screen, wherein the at least one additional command directs an embedded media terminal adaptor (eMTA) internal to the multimedia terminal device to reboot.

19. A method according to claim 15, wherein the command directs an embedded media terminal adaptor (eMTA) internal to the multimedia terminal device to run a test to trouble shoot a problem.

20. A method according to claim 15, further comprising selecting at least one additional command from a group of commands displayed on the display screen, the group of commands comprising:

a command that directs an embedded media terminal adaptor (eMTA) internal to the multimedia terminal device to perform a real-time Internet speed check for diagnosing a slow speed Internet connection problem; and a command that directs the eMTA to perform a test for diagnosing an intermittent Internet connection problem.

21. A method according to claim 15, further comprising selecting at least one additional command displayed on the display screen, wherein the at least one additional command directs an embedded media terminal adaptor (eMTA) internal to the multimedia terminal device to perform a set up operation with respect to a wireless access point of a home gateway.

22. A method according claim 15, wherein selecting the command further comprises:

navigating through a set of menus on the display screen of the portable cordless telephone handset; and selecting a desired option by activating an "enter" key of the portable cordless telephone handset.

23. A method according to claim 15, wherein the information describing the multimedia terminal device comprises a status of the multimedia terminal device.

\* \* \* \* \*

UNITED STATES PATENT AND TRADEMARK OFFICE
CERTIFICATE OF CORRECTION

PATENT NO. : 9,577,844 B2
APPLICATION NO. : 12/498098
DATED : February 21, 2017
INVENTOR(S) : Yucheng Jin et al.

Page 1 of 1

It is certified that error appears in the above-identified patent and that said Letters Patent is hereby corrected as shown below:

In the Specification

Column 11, Line 32, after "command signal" before "the eMTA" insert --requesting--

Signed and Sealed this
Twenty-third Day of May, 2017

Michelle K. Lee
*Director of the United States Patent and Trademark Office*